Patented July 20, 1943

2,324,467

UNITED STATES PATENT OFFICE 2,324,467

RECOVERY OF ORGANIC MATERIALS

Robert Louis Brandt, New York, N. Y., and Hans George Kirschenbauer, Palisade Park, N. J., assignors to Colgate-Palmolive-Peet Company, Jersey City, N. J., a corporation of Delaware No Drawing. Application April 25, 1940, Serial No. 331,604

12 Claims. (Cl. 260—627)

This invention is directed to the economical production of valuable organic materials, lubricants, dispersing agents, detergents and like materials as well as products adapted for use in the production of such agents from crude products of petroleum, and more particularly it relates to the purification of phenols and naphthenic acids from petroleum.

The so-called naphthenic acids are ordinarily obtained from naphthene or asphalt base petroleums in the alkali washes and contain large quantities of impurities. These impurities are generally hydrocarbons, phenolic including thiophenolic bodies and other oxygen and sulphur derivatives of petroleum. The impure acids are dark in color, and have a characteristic disagreeable odor. Distillation of the naphthenic acids improves the color but it does not eliminate the objectionable odor nor does it separate the oily non-acid impurities because the boiling range of these materials generally extends over the whole boiling range of the mixture of naphthenic acids. The extended use of naphthenic acids has been seriously impaired by the presence of the oily impurities and the distinct, unpleasant odor.

The present invention provides an economical process for the manufacture of relatively pure uniform organic materials from naphthenic acids or their soaps whether or not previously concentrated by fractional distillation, extraction and/or by other methods. By the present process it is now possible to prepare relatively pure phenols and naphthenic acids.

The purified phenolic materials are substantially free from carboxylic acids and unsaponifiable materials. They are valuable disinfectant, antiseptic, deodorant, germicidal and related agents. They may be used in the manufacture of synthetic resins, dyestuffs, cosmetics, plasticizers, medicines, seed disinfectants, perfumes, wetting and deterging agents and the like.

The purified naphthenic acid products with or without additional treatments may be used directly as soaps, either water-soluble or water-insoluble, or as acids for numerous purposes in the various industries. The acids as well as the soaps thereof are free from objectionable odor, contain only a very small proportion of unsaponifiable material, have a lighter color and as soaps have greater washing efficiency than those obtained by other processes. The soaps produced and the separated unsaponifiables have important advantages over products previously prepared from corresponding raw materials and hence may be used for purposes for which the prior art products would not be suitable. These acids may be sulphonated directly or in solutions containing chlorinated hydrocarbons, such as carbon tetrachloride and dichlorethane, and liquid sulphur dioxide to prepare valuable wetting, deterging and fat-splitting agents.

In accordance with the present invention, the naphthenic acids and the phenols in the form of their soaps are heated in an inert atmosphere to a temperature at least as high as the melting point of the substantially anhydrous soap, advantageously under reduced pressure, while passing a strong current of steam or non-acidic inert gas through it. This treatment removes the unsaponifiable, oily, and evil smelling materials from the naphthenic acid soaps, and apparently improves the characteristics of both the saponified and unsaponified material. The treatment may be carried out at various temperatures, preferably ranging from about 200° C. to about 375° C. In this temperature range, the substantially anhydrous mixture of naphthenic acid soaps and phenates are in a freely fluid form, such that the steam which is passed through it thoroughly agitates it, insuring uniformity of temperature throughout the mass and preventing any portions of the mass, for example those portions in contact with the walls of the vessel, from being overheated and subjected to decomposition. The strong current of steam or other inert gas which is used serves not only to agitate the liquid mass, but also to assist in the vaporization of the impurities which are distilled off and to blanket the mass and exclude air, thus preventing oxidation at the high temperatures employed.

The soaps and phenates, after the removal of substantially all of the volatile non-saponifiable materials, are similarly treated at the high temperature while passing the inert gas therethrough, but in addition the mass is treated with carbon dioxide or other weak acid to split the phenates without substantial splitting of the carboxylic acid soaps. The carbon dioxide with or without steam will carry out the volatilized free phenols which are condensed and recovered as pure materials.

This treatment alters physically and chemically the character of the saponified naphthenic acid products. They are higher in viscosity, free from objectionable odor and are substantially free from unsaponifiable material. They may be cooled out of contact with air with or without water, hydrated soap and/or other added ingredients. When previously distilled and/or otherwise purified light colored naphthenic acids are treated in this manner, the saponified products obtained are light in color.

The naphthenic acid soaps may be lightened in color by distillation and/or treatment with one or more bleaching agents such as chlorine, hypochlorite, clay or the like at any time during the treatment of the naphthenic acids in order to improve the final products. When a crude, dark, undistilled product is treated, it may be desirable, before and/or after the high temperature steam treatment, to split the soap and distill the acids to improve their color with or without clay treatment.

It is often desired to substantially separate the naphthenic acids and/or the phenols into individual fractions. The separation of the constituents may be effected by fractional distillation before and/or after the acids have been treated in the form of their anhydrous soaps at an elevated temperature in the presence of steam in order to first remove the phenols and non-saponifiable materials. The absence of the non-saponifiables which have a very broad boiling range renders the separation of pure naphthenic acids by distillation more effective. The material, however, may be fractionally distilled at any point before the above outlined high temperature steam treatment of the anhydrous soaps in order to separate the acidic constituents into fractions, followed by the novel treatment of the soaps thereof to separate the non-saponifiables and the pure phenols.

The fractional distillation may be carried out by any conventional procedure and is preferably conducted by taking the crude naphthenic acids, washing the acids free from water-insoluble extraneous matter, and drying the acids. The dried, washed acids are then ready for fractionation which is advantageously carried out by first rapidly heating the material in a suitable heater, such as a pipe still, so as to raise the temperature of the acids as they pass therethrough to substantially 250° to 300° C. as rapidly as possible within several minutes and without pyrolysis. The temperature and pressure are dependent upon the nature of the acids being treated. Steam, preferably superheated, may be added to the acids during the heating process in order to assist in the subsequent vaporization.

The acid vapors issuing from the heater pass into a flash chamber, preferably at a reduced pressure of about 5-10 mm., to separate the unvolatilized tarry and resinous portion from the volatilized desired acid portion, and the former drops to the bottom of the flash chamber at which point it may be withdrawn. Steam superheated to the heater outlet temperature is passed into the bottom of the flash chamber for stripping purposes. If desired, a stripping section may be included at the bottom of the chamber.

A number of fractionating systems are possible such as a series of individual fractionating bubble-plate columns or a single tower containing many bubble plates. In the former, the number of columns required is equal to the number of cuts desired less one. Thus the vapors issuing from the flash chamber are passed into a bubble-plate column supplied with superheated bottom stripping steam. In this column high boiling naphthenic acid bottoms are separated from the overhead. Reflux is supplied by means of a partial condenser located at the top of the column. The cooling medium for this condenser may be changing stock already raised in temperature by passage through the partial condensers connected to the succeeding columns that are operated at successively lower temperatures. In the succeeding column the lower boiling mixture of naphthenic acids is separated. By proper control of the individual reflux ratios and bottom steam ratio, taking also into consideration the effectiveness of the column, it is possible to cut the mixture of naphthenic acids into very narrow boiling fractions.

An alternative procedure is to separate the mixture by passing the vapors issuing from the flash chamber into a bubble plate or similar fractionating tower which maintains a suitable reflux. The hot liquid acids may be drawn from various plates in the tower which contain the largest percentage of individual naphthenic acids and are passed into individual reboilers. Steam superheated to the proper temperature is passed into the bottom of the reboiler where the feed is stripped of the more volatile portions, which vapors are returned to the column. The liquid withdrawn from the stripper may be a fairly pure naphthenic acid, but it generally will be found to contain a certain amount of other naphthenic acids. A more complete separation, of course, may be obtained upon further fractionation.

If desired, in either procedure, portions of certain of the fractions may be returned to the feed to raise the vapor pressure of the original mixture. In order to facilitate fractionation a current of steam is passed into the column from an open steam coil positioned in the bottom of the fractionating column or columns. The non-condensed vapors from the last or single column pass through a line into a vapor condenser wherein the temperature is so regulated that practically all of the naphthenic acid vapors are liquefied and the steam is left in the vapor state. Any suspended acids in the steam are removed by passing the steam around suitable baffles whereby the particles of the acid are removed. The steam freed from its suspended acids is preferably passed directly to a barometric condenser to which are connected suitable vacuum pumps or ejectors which serve to maintain the entire system under a suitable reduced pressure. It should also be noted that, although it is preferred to flash into the flash chamber, in some instances it may be desirable to flash the acids directly into the bottom of the fractionating tower. The process may be conducted in a continuous manner or it may be carried out in a batch procedure.

Although this description is directed to the fractional distillation of the acids freed from the non-saponifiable and phenolic material, the invention is not so limited and the fractional distillation may be similarly applied to the acids before the steam treatment of the anhydrous naphthenic acid soaps or before and after such treatment. The separation by distillation may be accomplished with or without additional materials, such as aliphatic, alicyclic, terpene and aromatic hydrocarbons, fatty acids and the like.

The invention will be further illustrated by the following specific example, although it is not limited thereto.

*Example*

220 parts by weight of crude naphthenic acids from a naphthene base crude and containing approximately 17% unsaponifiable matter and 9% of volatile phenolic materials are mixed with 33 parts by weight of caustic soda in the presence of a small amount of added water. The mixture is then heated in the absence of air to a temperature of about 270° C. while passing superheated steam therethrough. The treatment is continued for about an hour at that temperature. The unsaponifiable material containing a small amount of phenols is condensed from the steam. The condensate receiving vessel is changed and a stream of gaseous carbon dioxide is passed through the mixture in addition to the stream of superheated steam. This treatment is continued for about an hour thereby splitting the phenates and recovering the phenols in the steam condensate from the treating chamber. The steam condensate is saturated with sodium chloride and extracted with ethyl ether. The ether extracts are dried with anhydrous sodium sulphate and freed from solvent by evaporation thereof. The phenols recovered are about 18.5 parts by weight or approximately 8.5% of the total mixture.

An advantageous way to carry out the treatment to remove unsaponifiable material is to maintain a body of the naphthenic acid soaps at temperatures at which the anhydrous soaps are fluid, meanwhile passing steam therethrough, and to add the rest of the material, either as crude naphthenic acids and caustic alkali or as thinned crude soaps, at a rate not substantially greater than the rate at which it may be heated to the temperature necessary for fluidity, and to operate the process with continuous or successive additions of crude material and withdrawals of treated material. The thinned naphthenic acid soaps may be added by preheating the soap solution under pressure to a temperature well in the range of the treatment and to flash the solution with or without steam into the treating chamber, thereby removing water and some of the unsaponifiables in the soaps. This anhydrous soap may be treated directly with carbon dioxide or flue gases, passed therethrough or generated therein by decomposition of carbonates or bicarbonates, or it may be cooled, hydrated, acidified and/or similarly treated before retreatment plus carbon dioxide to recover phenols.

If the lower temperatures, in the neighborhood of 200° to 250° C., are used for the steam treatment of the anhydrous soap, a longer time of treatment and higher steam ratios are generally required to provide the substantially complete separation of the unsaponifiable constituents and the pure phenols. The time required for this separation will vary with the temperature of the treatment, the pressure maintained within the vessel, and the amount of steam used. It will also vary somewhat with the particular naphthenic acid material treated, as some acids contain more unsaponifiable material and phenols, or less volatile unsaponifiable material and phenols, than others. In general, the rapidity of separation of unsaponifiable material and phenols is greater at higher temperatures, at higher vacua, and with injection of greater quantities of steam. In general, temperatures of 250° to 300° C. are preferred. In some cases, temperatures in excess of 350° C. may be used, but it is advantageous to avoid the use of such high temperatures because of the danger of decomposition and/or discoloration. After treatment, the hot anhydrous soap is advantageously added to a hydrated soap in order to dissolve it more readily. The hydrated soap may also contain other addition agents before the anhydrous soap is added. The hot anhydrous water-soluble soap with or without steam, inert gas, and/or water may be sprayed, roll cooled or the like to form a hydrated or anhydrous soap powder, bead, flake or cake with or without the addition agents.

Various alkaline materials may be used for the saponification, including caustic alkalies (caustic soda or potash), lime, carbonated alkalies (soda ash or potassium carbonate), limestone, marble dust, magnesium carbonate, dolomite, etc., or mixtures thereof. Soda ash is preferred because it is cheap, effective, and produces a directly usable water-soluble sodium soap. It is important, however, that sufficient caustic alkali must be present to neutralize the phenols in the first stage of treatment. When preparing pigment dispersants for oil and resinous vehicles, it may be desirable to directly form the desired water-insoluble soap. It may be necessary to change the operating temperatures, if other alkaline materials than caustic soda are used, because of the differences in the melting points of the soaps formed with metals other than sodium. In any event, the temperature must be sufficiently high to avoid liquid water and to insure the necessary fluidity.

The process is applicable to the removal of volatilizable phenols from soap forming acids whether naphthenic acids or not. The naphthenic acids may be obtained from petroleum or may be prepared by any method such as reduction of aromatic acids including benzoic, phthalic and naphthoic acids with or without previous alkylation and/or acylation. For example, cyclohexanoic acid, decahydronaphthoic acid, dodecyl cyclohexanoic acid and the like may be treated by the process of this invention. It is possible to treat other organic acid materials alone or in mixtures, e. g., with naphthenic acids, to similarly recover valuable organic products such as acids, phenols and the like. For example, various oils, fats, waxes and resins may be similarly treated or be added to the naphthenic acids before any processing has been effected to remove various impurities which they may contain. Suitable addition agents are wool fat, certain grades of garbage grease, whale oil and fish oils, spermaceti, tallow, coconut oil, olive oil, various grades of wood and gum rosin, tall oil, cottonseed oil, linseed oil, China-wood oil, soya bean oil, palm oil, montan wax, carnauba wax, Japan wax, Chinese wax, as well as the various individual fatty or resin acids thereof or mixtures of any of these fats, oils, waxes, resins and acids. The new water-soluble soap compositions may be used in combination with any of the common auxiliary agents used in soap, detergent, emulsified, dispersed and related compositions.

Suitable addition agents to the purified soap products are other emulsifying agents including long-chain alcohol sulphate salts, monoglyceride monosulphate salts, salts of sulphonated mineral oil extracts, Turkey red oil, lecithin, ethanolamine soaps; alkaline soap builders such as borax, soda ash, trisodium phosphate, and sodium silicate; the water-soluble, water-softening phosphorus compounds of the type of tetraphosphoric, pyrophosphoric or hexametaphosphoric acid and their alkali metal, ammonia, and certain amine salts or alkyl esters; methyl and ethyl cellulose; coloring matter such as dyes, lakes, pigments; abrasives and fillers such as silica, pumice, feldspar, precipitated chalk, infusorial earth, bentonite, talc, starch, and air; liquids including carbon tetrachloride, perchlorethylene, trichlorethylene, glycerine, ethyl alcohol, glycol, tetrahydrofurfuryl alcohol, phenol, cyclohexanol, water, tetralin, decalin, pine oil, mineral oil, mineral oil extracts, and naphtha; perfumes and deodorants; fats, oils, fatty acids, monoglycerides, waxes, gums, flue and resins; germicides, such as phenol and organic or inorganic mercury compounds; any of the common water-soluble alkali metal or ammonium salts, and various mixtures thereof. The type of addition agent to be used will depend, of course, on the ultimate use of the new naphthenic acid soap composition. The various ingredients may be mixed with the soap by any of the common methods such as milling, stirring, kneading, grinding, crutching, fusing, and drying of mixed solutions or dispersions. The products, with or without other ingredients, may be produced in the form of powders, flakes, fibres, chips, ribbons, bars, cakes, solutions, and liquid or plastic emulsions or dispersions. The phenols may be alkylated, acylated and/or sulphonated to prepare valuable wetting, washing, emulsifying and plasticizing agents.

It will thus be seen that by the present invention there is provided a process for the production of relatively pure phenols, soaps and soap-like detergents, as well as non-acid material of commercially satisfactory qualities from the naphthenic acid products usually obtained from petroleum, and also as new products, the improved acid or soap products, phenols, and other products for various purposes.

As many widely different embodiments of the invention may be made without departing from the spirit and scope thereof, it is to be understood that the application is not limited to the specific proportions or embodiments thereof except as defined in the following claims.

We claim:

1. A process for the recovery of phenols from mixtures comprising essentially unsaponifiable substances, carboxylic acids and volatile phenols which comprises neutralizing the carboxylic acids and phenols, heating the neutralized carboxylic acids and neutralized phenols in an inert atmosphere to a temperature not lower than the melting point of the substantially anhydrous soap mixture in order to remove volatile non-saponifiable materials therefrom, and then heating the mixture to a temperature not lower than the melting point of the substantially anhydrous soap in the presence of an acid weaker than the carboxylic acid in the mixture, thus freeing the phenols in the mixture from their phenate salt form, and distilling the relatively pure volatile phenols therefrom.

2. A process for the recovery of phenols from mixtures comprising essentially unsaponifiable substances, carboxylic acids and volatile phenols which comprises neutralizing the carboxylic acids and phenols, heating the mixture in an inert atmosphere to a temperature not lower than the melting point of the substantially anhydrous soap mixture in order to remove volatile non-saponifiable materials therefrom, and then heating the mixture to a temperature not lower than the melting point of the substantially anhydrous soap in the presence of carbon dioxide, thus freeing the phenols in the mixture from their phenate salt form, and distilling the volatile relatively pure phenols therefrom.

3. A process for the recovery of phenols from mixtures comprising essentially unsaponifiable substances, carboxylic acids and volatile phenols which comprises neutralizing the carboxylic acids and phenols, heating the neutralized carboxylic acids and neutralized phenols to a temperature not lower than the melting point of the substantially anhydrous soap mixture while passing an inert gas therethrough in order to remove volatile, unsaponified materials therefrom, and then heating the mixture to a temperature not lower than the melting point of the substantially anhydrous soap in the presence of an acid weaker than the carboxylic acid soap while passing an inert gas therethrough, thus freeing the phenols in the mixture from their phenate salt form, and distilling the volatile relatively pure phenols therefrom.

4. A process for the recovery of phenols from mixtures comprising essentially unsaponifiable substances, carboxylic acids and volatile phenols which comprises neutralizing the carboxylic acids and phenols, heating the neutralized carboxylic acids and neutralized phenols to a temperature not lower than the melting point of the substantially anhydrous soap mixture while passing an inert gas therethrough in order to remove volatile, unsaponified materials therefrom, and then heating the mixture to a temperature not lower than the melting point of the substantially anhydrous soap in the presence of carbon dioxide, thus freeing the phenols in the mixture from their phenate salt form, and distilling the relatively pure volatile phenols therefrom.

5. A process for the recovery of phenols from mixtures comprising essentially unsaponifiable substances, carboxylic acids and volatile phenols which comprises neutralizing the carboxylic acids and phenols, heating the neutralized carboxylic acids and neutralized phenols to a temperature not lower than the melting point of the substantially anhydrous soap mixture while passing superheated steam therethrough in order to remove volatile non-saponifiable materials therefrom, and then heating the mixture to a temperature not lower than the melting point of the substantially anhydrous soap in the presence of an acid weaker than the carboxylic acid in the mixture while passing an inert gas therethrough, thus freeing the phenols in the mixture from their phenate salt form, and distilling the relatively pure volatile phenols therefrom.

6. A process for the recovery of phenols from mixtures comprising essentially unsaponifiable substances, carboxylic acids and volatile phenols which comprises neutralizing the carboxylic acids and phenolic substances, heating the neutralized carboxylic acids and neutralized phenols to a temperature not lower than the melting point of the substantially anhydrous soap mixture while passing superheated steam therethrough in order to remove volatile non-saponifiable materials therefrom, and then heating the mixture to a temperature not lower than the melting point of the substantially anhydrous soap while passing carbon dioxide therethrough, thus freeing the phenols in the mixture from their phenate salt form, and distilling the relatively pure volatile phenols therefrom.

7. A process for the recovery of phenols from mixtures comprising essentially unsaponifiable substances, carboxylic acids and volatile phenols which comprises neutralizing the carboxylic acids and phenols with caustic alkali, heating the neutralized materials in an inert atmosphere to a temperature not lower than the melting point of the substantially anhydrous soap mixture while passing an inert gas therethrough in order to remove volatile nonsaponifiable materials therefrom, acidifying the mixture, neutralizing the acidified mixture with alkali carbonate while heating the mixture in an inert atmosphere to a temperature not lower than the melting point of the substantially anhydrous soap while passing an inert gas therethrough and distilling the volatile relatively pure phenols therefrom.

8. A process for the recovery of phenols from mixtures comprising essentially unsaponifiable substances, carboxylic acids and volatile phenols which comprises neutralizing the carboxylic acids and phenols with caustic alkali, heating the neutralized material to a temperature not lower than the melting point of the substantially anhydrous soap mixture while passing an inert gas therethrough in order to remove volatile non-saponifiable materials therefrom, and then heating the mixture to a temperature not lower than the melting point of the substantially anhydrous soap in the presence of sufficient alkali bicarbonate to generate carbon dioxide at the treatment conditions, while passing an inert gas therethrough, thus freeing the phenols in the mixture from their phenate salt form, and distilling the volatile relatively pure phenols therefrom.

9. The process of claim 1 wherein the carboxylic acid is a naphthenic acid.

10. The process of claim 1 wherein the carboxylic acid is a fatty acid.

11. In a process for recovering phenols from a mixture comprising essentially naphthenic acids and volatile phenols in the absence of substantial amounts of volatile unsaponifiable material, the improvement which comprises neutralizing the naphthenic acids and phenols, heating the mixture to a temperature not lower than the melting point of the anhydrous naphthenic acid soap in the presence of an acid weaker than the naphthenic acids while passing an inert gas therethrough, thereby freeing the phenols in the mixture from their phenate salt form, and distilling the volatile phenols from said mixture.

12. In a process for recovering phenols from a mixture comprising essentially naphthenic acids and volatile phenols in the absence of substantial amounts of volatile unsaponifiable material, the improvement which comprises neutralizing the naphthenic acids and phenols with caustic soda, heating the mixture to a temperature not lower than the melting point of the substantially anhydrous naphthenic acid soaps formed, while passing superheated steam therethrough and simultaneously passing through the mixture a stream of gaseous carbon dioxide, thereby freeing the phenols in the mixture from their phenate salt form, and distilling the volatile phenols from said mixture.

ROBERT LOUIS BRANDT.
HANS GEORGE KIRSCHENBAUER.